United States Patent [19]

Roslonski

[11] Patent Number: 4,971,705

[45] Date of Patent: Nov. 20, 1990

[54] METHOD AND APPARATUS FOR DEWATERING MATERIAL

[76] Inventor: Donald Roslonski, 2424 Bridge Ave., Point Pleasant, N.J. 08723

[21] Appl. No.: 393,415

[22] Filed: Aug. 14, 1989

[51] Int. Cl.$^5$ .................. C02F 11/18; B01D 29/80; B01D 29/82

[52] U.S. Cl. .................. 210/742; 210/746; 210/748; 210/770; 210/149; 210/180; 210/243; 34/1; 100/127; 204/149

[58] Field of Search .............. 210/742, 746, 748, 770, 210/143, 149, 243, 180; 100/37, 38, 43, 127, 126, 226, 93 P; 34/1, 43; 204/149, 130, 131, 152

[56] References Cited

U.S. PATENT DOCUMENTS

| | | | |
|---|---|---|---|
| 965,486 | 7/1910 | Putt | 210/748 |
| 1,930,169 | 10/1933 | Halvorson et al. | 210/773 |
| 4,043,047 | 8/1977 | Gulliker | 210/748 |
| 4,101,400 | 7/1978 | Pepping | 210/748 |
| 4,655,932 | 4/1987 | Roslonski | 210/709 |
| 4,818,415 | 4/1989 | Kramer et al. | 210/770 |
| 4,861,496 | 8/1989 | Diaz | 210/243 |

Primary Examiner—W. Gary Jones
Attorney, Agent, or Firm—Clifford G. Frayne

[57] ABSTRACT

A method and apparatus for dewatering material, the material having a certain degree of conductivity, the material being introduced into a pressure chamber and simultaneously being compressed as electrical energy is introduced into the material elevating the temperature and driving off the fluid or water in the form of steam through apertures in the pressure chamber, the residence time being a function of the conductivity of the material, the dimensions of the pressure chamber and the electrical energy and pressure directed on the material.

9 Claims, 2 Drawing Sheets

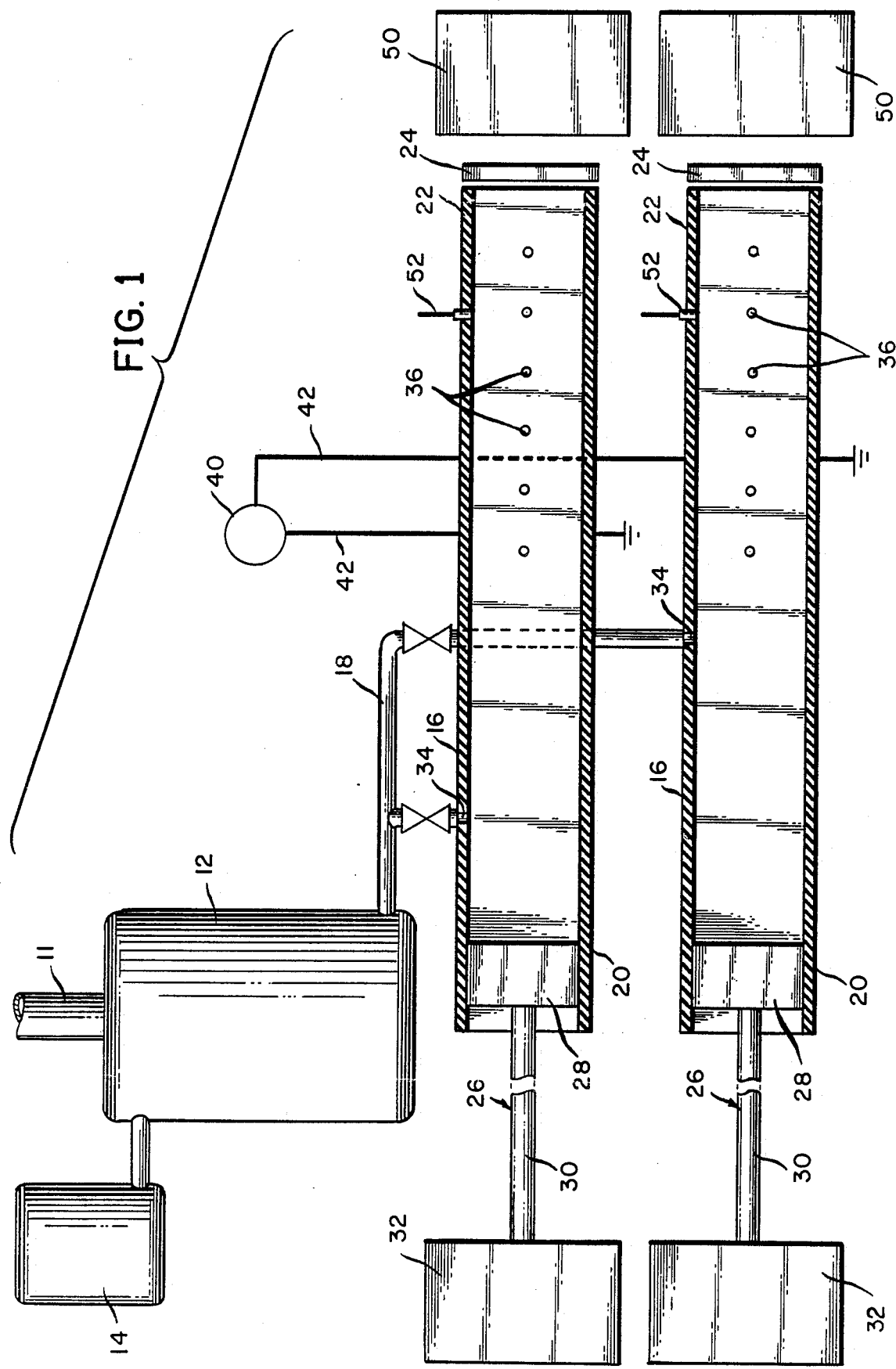

METHOD AND APPARATUS FOR DEWATERING MATERIAL

FIELD OF INVENTION

The method and apparatus claimed herein relates to the dewatering of material such as sludge and other process streams containing solids and liquid under the influence of pressure and selective electrical energy in a continuous process.

BACKGROUND OF THE INVENTION

Applicant's invention is directed toward a method and apparatus for treating sludge and other liquid waste streams, which contain a mixture of solids and liquids. Certain waste streams comprise a mixture of solid materials and water and in many instances, contain toxic materials, hazardous materials or heavy metals. Applicant's invention is directed toward the removal of water or other fluids in the waste stream such that the waste stream after treatment is substantially solid matter which can be either treated further or disposed.

Applicant's invention also provides substantial benefits with respect to hazardous or toxic substances contained in the waste stream. With respect to many toxic and hazardous materials, Applicant's device will neutralize the materials and at the same time sterilize pathogens and microorganisms contained in the sludge such that the resultant end product is a granulated solid which, in most cases, can be disposed of in sanitary landfills without any detriment to the environment. Applicant can accomplish this neutralization through the following procedure which represents substantial improvement in the amount of dewatering which can be accomplished with such a sludge stream thereby leaving the final product in a substantially solid, granulated form.

Applicant is the holder of U.S. Pat. No. 4,655,932 for a method and apparatus for the disintegration and destruction of hazardous and toxic sludge materials which utilize the process of blending the waste stream or sludge materials with an electrolyte to improve conductivity, partially dewatering the sludge stream in order to achieve a filter cake, pressing the filter cake to a desired thickness based on the conductivity of the filter cake and then subjecting the filter cake to electrical heat energy to drive off the remaining water resulting in a pulverized granular solid.

The present invention utilizes an electrolyte in combination with a mixed stream of solids and liquids, however, Applicant's final dewatering step utilizes a combination of electrical energy and pressure in order to substantially dewater water the material. Applicant's present invention has application to sludge streams or waste streams, but also to nonhazardous material in which there is a desire to remove the water content.

OBJECTS OF THE INVENTION

An object of the present invention is to provide a novel and continuous method for the substantial reduction of the water content of the waste stream.

A further object of the present invention is to provide a novel method for the reduction of water content of a waste stream and the reduction and volumetric capacity of the waste stream to solid particulate matter.

A still further object of the present invention is to provide a novel method and apparatus for the removal of fluid from a waste stream, the neutralization of certain hazardous or toxic matter in the waste stream and the recapture of the water for further industrial use.

A still further object of the present invention is to provide a novel method and apparatus for the removal of the fluid or water content of a material through the simultaneous application of electrical energy and pressure.

SUMMARY OF THE INVENTION

These and other objects of the present invention are achieved by a method and apparatus whereby a liquid waste stream is subjected to simultaneous pressure and electrical energy in an enclosed conduit, the pressure and electrical heat energy driving the water and fluid from the waste stream in the form of steam through apertures in the conduit, the steam being recaptured for further industrial use, and the waste stream being substantially dewatered reducing its volumetric capacity and resulting in solid matter available for disposal.

The pressure directed on the waste stream, the electrical energy subjected to the waste stream, and the amount of electrolyte mixed with the waste stream to enhance conductivity are interdependent upon each other and the character of the waste stream. In the steady state, continuous process envisioned, these three factors would be automatically adjusted dependent upon the character of the waste stream.

BRIEF DESCRIPTION OF THE DRAWINGS

A better understanding of the present invention as well as objects and advantages thereof will become apparent upon consideration of the detailed disclosure thereof especially when taken with the accompanying drawings wherein:

FIG. 1 is a top view of the preferred embodiment of the apparatus and process for dewatering a liquid waste stream.

DETAILED DESCRIPTION OF THE DRAWINGS

Figure 3:
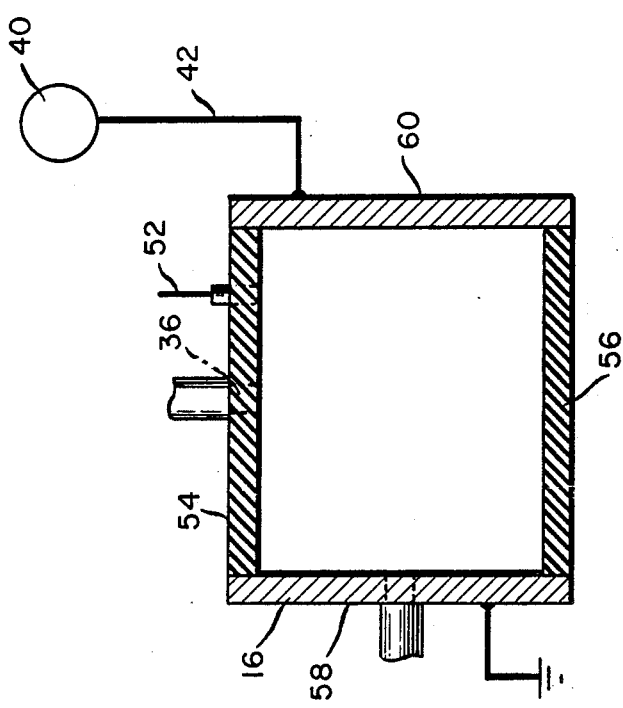
FIG. 3 is an end sectional view of the preferred embodiment of the apparatus and process for dewatering a liquid waste stream.

Referring to FIG. 1, there is shown a top view of the preferred embodiment for the heating and dewatering of a waste stream. The process is designed to perform in a continuous manner. The waste stream or sludge stream would normally be introduced via conduit 11 into holding tank 12. An analysis of the waste stream would determine the contents of the waste stream and the electrical conductivity of the waste stream for the subsequent introduction of electrical energy to the waste stream. If the electrical conductivity were to be found of a low character, a suitable electrolyte 14 would be introduced into the holding tank 12 to be mixed with the sludge or waste stream. Thereafter, the sludge or waste stream would be introduced into a pressure chamber 16. Sludge or waste stream 12 would be introduced into pressure chamber 16 by means of conduits 18. Preferably, at least two pressure chambers 16 would be established in tandem. Pressure chamber 16 would be of a longitudinal character having a first end 20, and a second end 22, second end 22 being selectively closed by means of slide valve 24 or equivalent.

Reciprocally disposed within pressure chamber 16 would be a piston means 26. Piston means 26 would comprise a piston head 28 whose circumference substantially conforms to the interior circumference of pressure chamber 16 and a pushrod 30, secured to a reciprocating motor or hydraulic means 32. The stroke of piston head 28 would be dependent upon the longitudinal dimensions of pressure chamber 16 and the desired flow rate of the waste stream. Conduit 18 providing pressure chamber 16 with the waste stream or sludge stream would have an inlet port 34 in pressure chamber 16, forward of piston head 28.

Selectively positioned along pressure chamber 16 would be a plurality of apertures 36, to permit the escape of vaporized fluid and liquid as described hereafter. These apertures would provide a tortuous path for the escape of the vapor and liquid while preventing the solid particulate matter from escaping pressure chamber 16.

Figure 2:
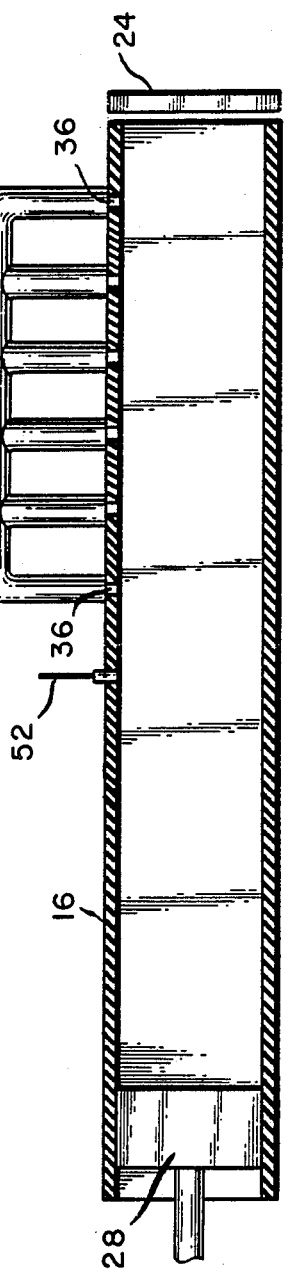
FIG. 2 is a side cutaway elevational view of the preferred embodiment of an apparatus and process for dewatering a liquid waste stream.

As shown in FIG. 1, the pressure chamber 16 would be established in tandem so that each one would alternately be compressing a waste stream subjecting the waste stream to electrical energy while the second chamber was being charged with the waste stream. Referring to FIG. 2, there is shown a side elevational cutaway view of one of the pressure chambers. Once the pressure chamber 16 was charged with the waste stream, reciprocating motor or hydaulic means 32 would cause pushrod 30 to move piston head 28 longitudinally within pressure chamber 16 compressing the waste stream. Simultaneously, electrical energy from power source 40 would be communicated to pressure chamber 16 by means of conduit cable 42 thereby heating the waste stream. The electrical energy so introduced to the waste stream would be dependent upon the character and nature of the waste stream and the conductivity of same. In the compression step and the subjection of the waste stream to electrical energy, the fluid contained in the waste stream would be substantially vaporized and exit compression chamber 16 by means of apertures 36. Aperture 36 would be in communication with a collection means 46 for the receipt of the captured fluid.

Once substantially all of the vapor or fluid had been driven off of the waste stream, slide valve 24 at end 22 of pressure chamber 22 would be opened to permit piston head 28 to discharge the remaining solid matter into collection chamber 50. The temperature within pressure chamber 16 and in particular, the temperature of the waste stream would be monitored by thermocouples 52 which could be selectively positioned in chamber 16.

Piston head 28 would then reciprocally move rearwardly and slide valve 24 would close. Once piston head 28 had reached its rear-most position, the pressure chamber would be recharged and the process would commence anew. With two pressure chambers 16 set in tandem, while one pressure chamber was being charged, the other would be undergoing the compression step for the removal of water or fluid from the waste stream.

Referring to FIG. 2, there is shown a longitudinal cross sectional view of a pressure chamber 16 showing a piston head 28 positioned within pressure chamber 16 and the position of apertures 36 for the escape and collection of steam or water vapor driven off as a result of the compression of the waste stream and the introduction of electrical energy to the conductive waste stream, the water vapor or steam being collected in chamber 46. Thermocouple 52 is shown positioned in compression chamber 16 to monitor the temperature of the sludge stream. It will be recognized by those skilled in the art that the location of the thermocouple may be modified and relocated within pressure chamber 16 with the primary consideration being that it does not interfere with the movement of piston head 28 through pressure chamber 16. FIG. 3 is a cross sectional view of pressure chamber 16 along plane A—A of FIG. 1. FIG. 2 and FIG. 3 cooperate to show the manner in which the heat in the form of electrical energy is transferred to the sludge stream.

In FIGS. 2 and 3, pressure chamber 16 is shown as a chamber having a substantially rectangular or square cross sectional area. This design is utilized so that the conductive side plates are equal distance apart. This serves to provide uniform current density through the entire chamber and minimizes arcing. Pressure chamber 16 is defined by a top wall 54, a bottom wall 56, and opposing sidewalls 58 and 60. Top wall 54 contains apertures 36 for the escape and collection of steam and water vapor; however, apertures 36 could be located in sidewalls 58 and 60. Piston head 28 moves within the chamber defined by the top wall, bottom wall and sidewalls from open end 20 to selectively closeable end 22. The top wall and bottom wall of pressure chamber 16 are constructed of substantially nonconductive material and sidewalls 58 and 60 are constructed of conductive material. In operation, piston head 28 has compressed the waste stream contained within pressure chamber 16 such that it occupies substantially the entire chamber defined by top wall 54, bottom wall 56 and sidewalls 58 and 60. The waste stream is mixed with electrolyte and is conductive and an electrical current is introduced from electrical energy source 40 through conduit 42 and sidewall 60 through the sludge stream and sidewall 58. The combination of the pressure of piston head 28 within pressure chamber 16, the conductivity of the electrical energy through the waste stream results in the elevation of the temperature of the waste stream driving off fluid and water vapor and as a result of the elevated temperatures, pathogens and microorganisms within the waste stream would be substantially destroyed. The thermocouples 52 would monitor the temperature within pressure chamber 16 and automatically control the flow of electrical energy so as to result in a solid dewatered product within pressure chamber 16 and to prevent the temperature reaching the point where combustion would occur within pressure chamber 16. The electrical energy being introduced into the waste stream would be decreased or halted before combustion could occur and slide valve 24 would open so that piston head 28 could evacuate pressure chamber 16 of the dewatered, solid material. Piston head 28 would then reciprocate to the start position for a repeat of the process.

The pressure, residence time and electrical energy required to accomplish the task depend upon the character of the waste stream and the conductivity of the waste stream. As previously mentioned, the conductivity of the waste stream can be modified through the introduction of electrolyte 14 into the waste stream. The size of pressure chamber 16 and, more particularly, the distance between sidewall 60 and 58 are a function of the residence time required within pressure chamber 16 of the sludge stream. The greater the distance between sidewalls 58 and 60 and, the longer the residence time assuming the same amount of electrical energy being introduced into the sludge stream.

In conventional mechanical dewatering processes or techniques, the results are limited by the fact that eventually, the pressure mechanically imposed upon the sludge stream to remove fluid eventually reaches a point where the solids or particulate matter are forced through the filter medium. In the instant matter, there is no filter medium. The pressure imposed on the sludge stream within pressure chamber 16 by piston head 28 can be steadily increased as water vapor escapes as a result of the introduction of electrical energy into the waste stream thereby lessening the volume within pressure chamber 16 and permitting the increase in pressure which simultaneously provides for better contact between the solid particles and conductive sidewalls 58 and 60 which enhance the conductivity which further drives off additional water vapor and raises the temperature of the sludge stream to a point where the pathogens and microorganisms contained within the sludge stream are destroyed.

Piston 28 and slide valve 24, as well as top wall 54 and bottom wall 56 are made of nonconductive insulating material to ensure that the path of the electrical energy flows from energy source 40, through electrical conduits 42 through conductive sidewall 60, and thence through the waste material to conductive sidewall 58.

In the embodiment shown, sidewalls 58 and 60 are composed of a conductive material.

Depending upon the configuration of pressure chamber 16, the final substantially dewatered, solid product would resemble a plug having the dimensions equivalent to the cross sectional dimensions of pressure chamber 16 and the distance between piston 28 and slide valve 24.

In operation, the apparatus accomplishes the dewatering of the waste stream or sludge stream by drying the material inside the pressure chamber from the inside to the outside surface. This prevents an outer film from forming between the sludge stream and the interior walls of the chamber which many times would inhibit drying. In an actual test, a chamber measuring four inches high, four inches wide and sixteen inches long was filled with a sludge stream which was 94% water. The apertures for the escape of liquid or water vapor were 3/32 of an inch with an inside taper. The chamber was charged and pressure was applied until material was in evidence at the apertures. The pressure was then released slightly. At that point, 480 volts at approximately 50 amps was introduced by means of the conductive sidewalls. Water vapor and fluid began to migrate through the apertures in the sidewalls within fifteen seconds with full drying being accomplished within two minutes. During the drying phase, current readings would drop as water vapor or fluid was driven from the sludge stream. This was a result of voids within the chamber affecting the conductivity. Therefore, pressure was incrementally increased during the drying stage to maintain contact between the particles within the chamber. The drying phase is substantially complete when the incremental increases in pressure do not result in the current leveling off, but rather, the current would continue to drop. At this point, substantially all of the water will have been removed from the waste stream. In this instance, on this test run, the material had been reduced to 100% solids.

The residence time can be decreased by increasing the voltage or increasing the conductivity of the waste stream by the introduction of an electrolyte. The electrical energy required for a particular waste stream would be a function of the amount of water or other fluid in the waste stream.

Through tests, it has been determined that while the end result is a solid material in a plug form, conforming substantially to the dimensions of the pressure chamber, a splitting apart of the plug reveals that the interior of the plug is composed of granular particulate matter substantiating the interior to outside surface drying effect of the material.

In sludge streams in particular, the water or fluid is normally bound in the solid material making the mechanical filtration extremely difficult since the solid material would eventually block the filter media or pass through the filter media. Applicant's invention provides a novel and inexpensive means of dewatering waste streams and, in particular, sludge streams insuring a substantially complete dewatering without the concern for down time associated with filter media blockage.

I claim:

1. An apparatus for the dewatering and drying of a waste stream comprising;
   a pressure chamber having an inlet means and an outlet means, said pressure chamber having a compression means slidably positioned therein, said pressure chamber constructed of non-conductive material on two opposing sides and conductive material on two opposing sides of said pressure chamber, said compression means and said inlet and outlet means being constructed of nonconductable material;
   a vapor outlet means positioned on said pressure chamber;
   a temperature monitoring means positioned on said pressure chamber;
   an introduction means for the introduction of waste stream into said pressure chamber;
   a power means for activation of said slidable compression means;
   an electrical energy means for introduction of current to said pressure chamber.

2. An apparatus in accordance with claim 1 wherein said waste stream is electrically conductive and one of said conductive sides of said pressure chamber is in communication with an electrical energy source, the opposing conductive side of said pressure chamber is in communication with an electrical ground.

3. An apparatus in accordance with claim 2 wherein said compression means simultaneously compresses said waste stream within said pressure chamber while electrical energy is communicated from said electrical energy source through said conductive sidewalls of said pressure chamber.

4. An apparatus in accordance with claim 3 wherein said outlet means for fluid and vapor comprises a plurality of apertures for the escape and collection of said fluid and vapor.

5. An apparatus in accordance with claim 4 wherein said outlet means of said pressure chamber comprises a slide valve for the exit of substantially dewatered solid material under the influence of said compression means subsequent to the dewatering of said waste stream.

6. An apparatus in accordance with claim 5 wherein pressure is increased by said compression means proportionate to decrease in said current readings as fluid and vapor are driven from said pressure chamber, said pressure increased by said compression means to maintain surface-to-surface contact with said solids in said sludge stream.

7. An apparatus in accordance with claim 6 wherein said dewatering and drying is substantially complete when said current continues to drop despite increase in pressure.

8. A process for the dewatering of a waste stream containing liquid and solid components comprising:
 (a) measuring the conductivity of the waste stream;
 (b) improving the conductivity of the waste stream by mixing electrolyte in said waste stream;
 (c) introducing the waste stream into a pressure chamber;
 (d) Compressing the waste stream within the pressure chamber and simultaneously introducing electrical energy into the waste stream by means of conductive panels on the pressure chamber;
 (e) vaporizing the fluid or water in the waste stream within the pressure chamber;
 (f) venting the fluid or water vapor from said pressure chamber;
 (g) discharging said substantially dewatered solid material from said pressure chamber;
 (h) repeating steps a through g.

9. A process in accordance with claim 8 wherein said compression step and said introduction of said electrical energy are adjusted to maintain surface-to-surface contact with said solid material in said pressure chamber as said fluid and vapor are driven off, said compression step increasing to maintain a steady current reading, said current reading decreasing despite increased compression when said material is substantially dewatered and dried.

* * * * *